Figure 1:
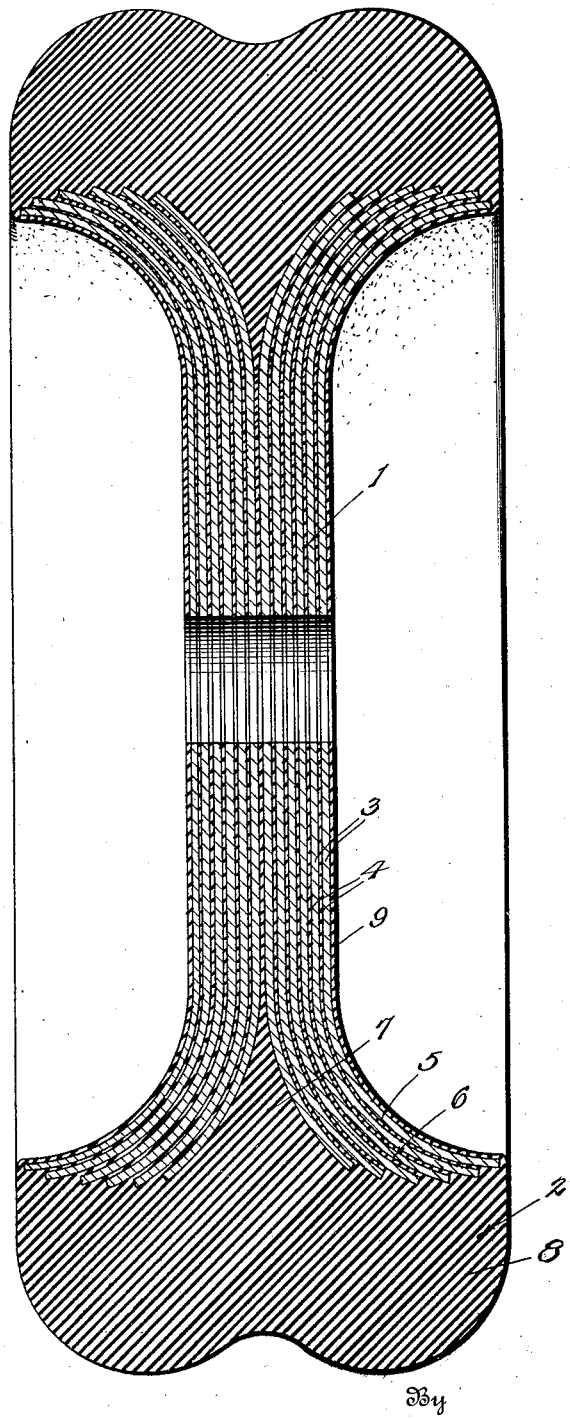

June 12, 1923.

H. N. ATWOOD 1,458,380

VEHICLE WHEEL

Filed Dec. 10, 1921      2 Sheets-Sheet 1

Inventor

H.N. Atwood.

By

Lacy & Lacy, Attorneys

June 12, 1923.

H. N. ATWOOD

VEHICLE WHEEL

Filed Dec. 10, 1921

1,458,380

2 Sheets-Sheet 2

Inventor
H. N. Atwood.

By Lacy & Lacy, Attorneys

Patented June 12, 1923.

1,458,380

UNITED STATES PATENT OFFICE.

HARRY N. ATWOOD, OF SMITHFIELD, NORTH CAROLINA, ASSIGNOR TO RUBWOOD, INC., OF LAWRENCE, MASSACHUSETTS, A CORPORATION OF MASSACHUSETTS.

VEHICLE WHEEL.

Application filed December 10, 1921. Serial No. 521,373.

*To all whom it may concern:*

Be it known that I, HARRY N. ATWOOD, a citizen of the United States, residing at Smithfield, in the county of Johnston and State of North Carolina, have invented certain new and useful Improvements in Vehicle Wheels, of which the following is a specification.

This invention relates to improvements in vehicle wheels of the solid tire type shown in my co-pending application, filed Nov. 21, 1921, Serial No. 516,766, and is designed particularly for use upon automobile trucks, busses, and other heavy types of motor vehicles.

It is usually the practice, in constructing wheels of this type to build up a wheel body of wood or metal, fit thereto the standard hub parts, equip the body with a felloe band, and shrink onto this band a metallic tire band or rim onto which the solid rubber tire is molded. A wheel so constructed will possess great strength because of its rigidity but it will possess practically no resiliency and therefore the shocks of impact to which such a wheel is subjected are not at all absorbed but are transmitted to the running gear setting up a vibration which is detrimental to the proper functioning of the running gear and propelling means for the vehicle and shortening the life thereof. Even where attempts have been made to lessen the rigidity of such a wheel and impart thereto a degree of resiliency by embodying in the structure of the wheel dished metallic plates or disks, the desired results have not been obtained for the reason that the dishing of a metallic plate, while it might seem to increase the resiliency thereof, in fact reinforces it so that it is rendered even more rigid than in its plane form. It is therefore one of the primary objects of the present invention to provide a wheel substantial and durable in its structure but possessing a maximum degree of resiliency and therefore adapted to sustain heavy loads without liability of collapse, and to effectually absorb shocks of impact and enhance the smooth running of the vehicle upon which it is installed.

Another equally important object of the invention is to provide a wheel of the solid tire type in which the tire constitutes an integral part of the wheel body so that the time, labor, and expenses incident to the molding of the usual rubber tire to the rim and the assemblage of this rim with the wheel felloe, as well as the building up of the body of the wheel and the application thereto of the felloe band, are to a great extent limited or materially reduced and there is no likelihood of disarrangement of the component parts of the wheel under running conditions. Also the employment of parts tending to impair the resiliency of the wheel is avoided, and there is not the liability to breakage which is present in the ordinary type of wheel.

A further object of the invention is to so construct the body and tread of the wheel that while the tread is relatively massive and broad as is required in wheels of the truck type, yet the said tread will be yieldable and resilient throughout all portions of its road-engaging area thus producing a cushioning effect to a maximum degree.

Another important object of the invention is to provide a vehicle wheel so constructed that in its manufacture it may be given any desired shape and dimensions and may be readily adapted for the application thereto of standard wheel parts such for example as the hubs and securing bolts therefor, brake drums and the like.

Figure 2:
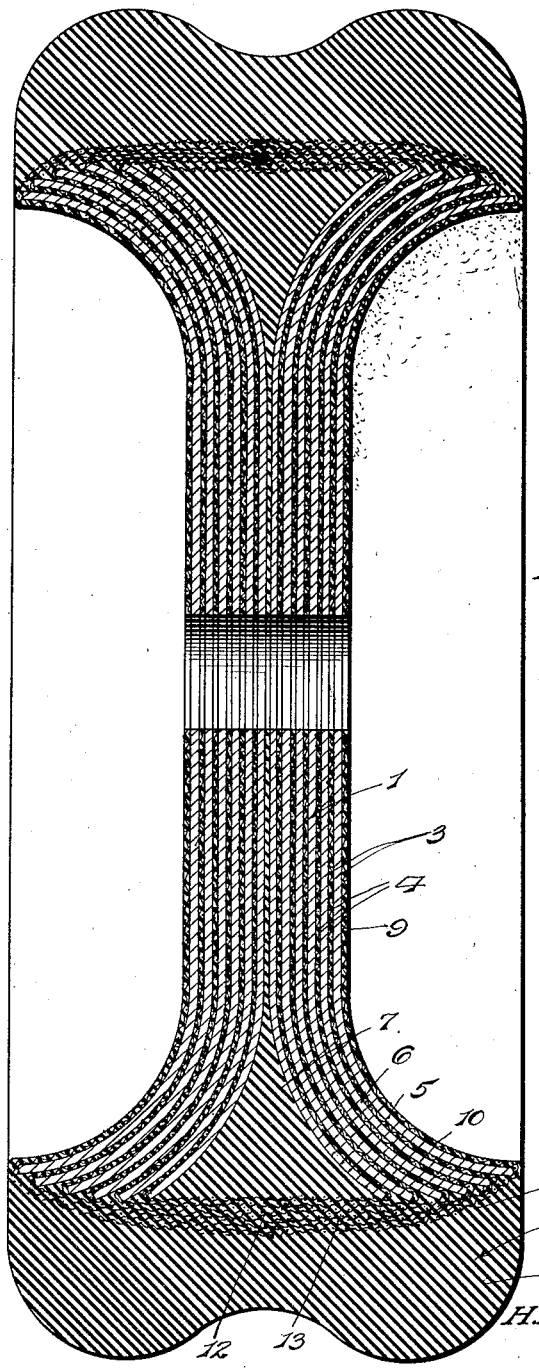

In the accompanying drawings:

Figure 1 is a diametric sectional view through a wheel body constructed in accordance with the present invention; and Figure 2 is a similar view illustrating a modification of the invention.

The wheel embodying the invention constitutes an integral structure, and while the portion of the wheel which contacts the ground surface serves precisely the same purpose as the ordinary solid rubber tire, it will probably be more proper and exact to consider the wheel as comprising a body and an integral elastic tread. The wheel may therefore be said to comprise a body portion and a tread portion, the former being indicated in general by the numeral 1 and the latter in general by the numeral 2.

In both forms of the invention the body 1 of the wheel is of laminated structure and comprises a plurality of veneer plies 3 and intervening plies 4 of rubber. The veneer plies 3 are of disk-like form and when properly arranged, the grain in adjacent plies will preferably run in non-corresponding directions so as to secure the greatest possible degree of reinforcement and render the wheel uniformly resistant to stresses which would tend to split it. The veneer plies 3 and rubber bonding plies 4 are alternately disposed, and the plies 4 serve not only as a means for bonding together the plies 3, when the assemblage of plies is subjected to a process of vulcanization in the manufacture of the wheel body, but these plies 4 serve also as a shock absorbing medium.

In preparing the veneer plies 3 prior to assemblage of these plies with the bonding plies 4 and the application of the tread 2, veneer blanks of circular form and any desired thickness are prepared and are subjected to pressure or to heat and pressure or otherwise acted upon in a manner to distort their peripheral portions from the plane of their central portions so that the said peripheral portions will assume a curved or concave form as indicated by the numeral 5. Thus the plies are given a permanent dished contour, their central portions however remaining plane. The degree of curvature of the peripheral portions 5 may be varied as desired but is preferably somewhat pronounced. In the finished structure and in assembling the plies in building up the structure, the said plies 3 are arranged in two sets in such manner that the central portions of all of the plies will occupy substantially parallel planes whereas the concaved or dished peripheral portions of the plies of the two sets will be curved in relatively opposite directions or in other words toward the relatively adjacent sides of the structure as a whole. In this manner the wheel body is provided peripherally with circumferential tread sustaining shoulders indicated by the numeral 6. It will be observed that while the peripheral portion 5 of the outermost ply of each set is curved through an arc of substantially 90°, the arcs of curvature of the corresponding portions of succeeding plies ranging toward the innermost ply of the set are of successively decreasing degree with the result that the margins of the said portions of the plies of each set are, in the order stated, spaced inwardly with relation to each other. Therefore the tread sustaining shoulders 6 are, when considered as a whole, of gradually decreasing thickness in the direction of the corresponding side of the structure. Therefore the said shoulders will be of an increasing degree of resiliency in a like direction and will be more yieldable at their laterally outer portions than at their inner portions.

In assembling the component parts of the wheel body, the bonding plies 4 of uncured or semi-cured rubber are interposed between the veneer plies 3 of the two sets, and the assemblage thus produced is then ready for the application of the tread 2. In building up the tread a suitable mass of uncured or semi-cured rubber is packed into the space between the relatively adjacent sides of the peripheral portions of the innermost veneer plies of the two sets, as indicated by the numeral 7, and the body of the tread, indicated by the numeral 8, is similarly built up about the circumferential surfaces of the tread sustaining shoulders 6. Also facing plies 9 of rubber are applied over the outer faces of the outermost veneer plies 3 and at their peripheries form juncture with the body 8 of the tread 2. The whole is then subjected to a process of vulcanization in which process the bonding plies 4 will become intimately united to or incorporated with the veneer plies 3 thus establishing a permanent elastic or resilient bond between these plies. Likewise the filling 7 will become intimately incorporated with the portions of the plies between which it is disposed, and the body 8 of the tread 2 will become integrally united with the peripheral portions of the bonding plies 4 and with the contiguous portions of the plies 3. It will be understood of course that the tread body 8 may be given any desired contour and may be of any desired dimensions. Also it may be solid in the strict sense of the word as illustrated in the drawings, or it may be formed in any manner found expedient.

From the foregoing it will be evident that a wheel body constructed in accordance with the present invention will possess a tread constituting a permanent and integral part thereof and that while the tread sustaining shoulders 6 serve to firmly support the body of the tread, they will possess a degree of resiliency which, in conjunction with the inherent resiliency of the tread body, will impart to the wheel, to the requisite degree, the properties of elasticity, resiliency, and yieldability which are essential in absorbing the shocks and otherwise cushioning the travel of the wheel over the road surface. It will also be evident that while the lateral portions of the tread body 8 are yieldable or resiliently supported by the tread sustaining shoulders 6, the intermediate portion of the tread body is equally yieldable and resiliently supported by the filling 7 and because of the yielding resistance offered by the shoulders 6 to lateral expansion of this filling when inwardly compressed.

The wheel illustrated in Figure 2 of the drawings is structurally the same as the wheel illustrated in Figure 1 except that in this modified form sheets or plies 10 of wire mesh or similar foraminous material are embedded in the bonding plies 4 and facing plies 9 and, in the assembling of the wheel, are permitted to extend beyond the peripheries of the plies 3. In assembling the component parts of a wheel of this modified form, the filling 7 is packed into the space between the shoulders 6 of the two sets of veneer plies, and then the extended portions of the foraminous plies 10, which portions are indicated by the numeral 11, are folded laterally inwardly so as to overlie this filling and so as to overlap one another and meet at their edges as indicated by the numeral 12. The said portions of the foraminous plies therefore establishes a reinforcing web 13 extending circumferentially of the body of the wheel and transversely across the space between the shoulders 6 of the two ply assemblages. The tread body 8 is applied and formed in the same manner as previously explained. By employing the foraminous plies 10 and arranging the plies and their extended portions 11 in the manner recited, the wheel is materially reinforced and the dished peripheral portions 5 of the veneer plies are especially afforded reinforcement and are prevented from splintering and protected against injury.

Having thus described the invention what is claimed as new is:

1. A vehicle wheel comprising a body having resilient, circumferential relatively laterally displaced tread sustaining shoulders, and a tread forming a substantially integral part therewith and extending over and between the shoulders.

2. A vehicle wheel comprising a body having circumferential laterally outwardly extending resilient tread sustaining shoulders, and a tread supported thereby and extending over and between said shoulders and forming a substantially integral part therewith.

3. A vehicle wheel comprising a body having circumferential laterally outwardly curved resilient tread sustaining shoulders, and a tread disposed about and between said shoulders.

4. A vehicle wheel comprising a body consisting of plies of veneer having their peripheral portions dished, the plies being arranged in sets with the said portions curving in opposite directions, and a tread extending about the said portions and supported thereby.

5. A vehicle wheel comprising a body consisting of plies of veneer having their peripheral portions dished, the plies being arranged in sets with the said portions curving in opposite directions, and a tread extending about the said portions and supported thereby and forming a substantially integral part therewith.

6. A vehicle wheel comprising a body consisting of plies of veneer and intervening bonding plies of cushioning material, the said veneer plies having their peripheral portions outwardly curved toward opposite sides of the body to provide tread sustaining shoulders, and a tread surrounding the body and resiliently supported by said shoulders.

7. A vehicle wheel comprising a body consisting of plies of veneer and intervening bonding plies of cushioning material, the said veneer plies having their peripheral portions outwardly curved toward opposite sides of the body to provide tread sustaining shoulders, and a tread surrounding body and resiliently supported by said shoulders, the tread being of the same cushioning material as the bonding plies and integrally united therewith.

8. A vehicle wheel comprising a body consisting of resilient plies of material and intervening bonding plies of cushioning material, the first mentioned plies having their peripheral portions curved outwardly toward the opposite sides of the body, and a tread surrounding and resiliently supported by said portions of the plies and seating also between the said portions of the plies.

9. A vehicle wheel comprising a body consisting of circular plies of veneer and intervening bonding plies of rubber material, the veneer plies being arranged in sets at opposite sides of the midplane of the body and having their peripheral portions curved outwardly in opposite directions from said plane whereby to provide circumferential tread sustaining shoulders, and a tread extending about and supported by said shoulders.

10. A vehicle wheel comprising a body consisting of circular plies of veneer and intervening bonding plies of rubber material, the veneer plies being arranged in sets at opposite sides of the midplane of the body and having their peripheral portions curved outwardly in opposite directions from said plane whereby to provide circumferential tread sustaining shoulders, and a tread extending about and supported by said shoulders, the said tread being integrally united with the bonding plies.

11. A vehicle wheel comprising a body consisting of circular plies of veneer and intervening bonding plies of rubber material, the veneer plies being arranged in sets at opposite sides of the midplane of the body and having their peripheral portions curved outwardly in opposite directions from said plane whereby to provide circumferential tread sustaining shoulders, and a tread extending about and supported by said shoulders, the said tread being integrally united with the bonding plies and having a portion filling the space between the said outwardly curved peripheral portions of the veneer plies.

12. A vehicle wheel comprising a body consisting of circular plies of veneer and intervening bonding plies of rubber material, the veneer plies being arranged in sets at the opposite sides of the midplane of the body, the peripheral portions of the plies of the two sets being outwardly curved in opposite directions to provide resilient tread sustaining shoulders, the margins of the said peripheral portions of the veneer plies being successively spaced inwardly with relation to one another from the outermost to the innermost ply of each set whereby said shoulders are of gradually decreasing thickness and increasing resiliency and yieldability in the directon of their outer portions, and a tread surrounding and supported by said shoulders.

13. A vehicle wheel comprising a body consisting of circular plies of veneer and intervening bonding plies of rubber material, the veneer plies being arranged in sets at the opposite sides of the midplane of the body, the peripheral portions of the plies of the two sets being outwardly curved in opposite directions to provide resilient tread sustaining shoulders, the margins of the said peripheral portions of the veneer plies being successively spaced inwardly with relation to one another from the outermost to the innermost ply of each set whereby said shoulders are of gradually decreasing thickness and increasing resiliency and yieldability in the direction of their outer portions, and a tread surrounding and supported by said shoulders, the tread being of rubber material and being integrally bonded with the said bonding plies.

14. A vehicle wheel comprising a body consisting of circular plies of veneer and intervening bonding plies of rubber material, the veneer plies being arranged in sets at the opposite sides of the midplane of the body, the peripheral portions of the plies of the two sets being outwardly curved in opposite directions to provide resilient tread sustaining shoulders, the margins of the said peripheral portions of the veneer plies being successively spaced inwardly with relation to one another from the outermost to the innermost ply of each set whereby said shoulders are of gradually decreasing thickness and increasing resiliency and yieldability in the direction of their outer portions, and a tread surrounding and supported by said shoulders, the tread being of rubber material and being integrally bonded with the said bonding plies, and also filling the space between the innermost veneer plies of the two sets.

15. A vehicle wheel comprising a body having circumferential laterally outwardly curved tread sustaining shoulders of increasing resiliency in the direction of their laterally outer portions, and a tread surrounding and supported by said shoulders.

16. A vehicle wheel comprising a body having circumferential laterally outwardly curved resilient tread sustaining shoulders, said shoulders being of gradually decreasing thickness in the direction of their laterally outer portions.

17. A vehicle wheel comprising a body consisting of plies of veneer and intervening bonding plies of cushioning material, foraminous plies embedded in the bonding plies and having portions extending beyond the peripheries of the veneer plies and folded in toward the midplane of the body in overlapping relation, and a tread surrounding the periphery of the body and embedding the said extended portions of the foraminous plies and integrally bonded with the bonding plies.

18. A vehicle wheel comprising a body consisting of plies of veneer and intervening bonding plies of rubber, foraminous plies embedded in the bonding plies and having portions extending beyond the peripheries of the veneer plies and folded in toward the midplane of the body in overlapping relation, and a tread surrounding the periphery of the body and embedding the said extended portions of the foraminous plies and integrally bonded with the bonding plies.

19. A vehicle wheel comprising a body consisting of plies of veneer and intervening bonding plies of cushioning material, the veneer plies having their peripheral portions dished and the said plies being arranged in sets with their said portions curved in opposite directions, foraminous plies embedded in the bonding plies and having peripheral portions extending beyond the peripheries of the veneer plies, the said extended portions of the foraminous plies of the two sets being folded inwardly in overlapped relation, and a tread surrounding the body and embedding the said portions of the foraminous plies and filling the space between the peripheral portions of the sets of veneer plies and integrally bonded with the said bonding plies.

20. A vehicle wheel comprising a body consisting of plies of body material having their peripheral portions dished, the plies being arranged in sets with the said portions curving in opposite directions, and a tread extending about the said portions and supported thereby.

21. A vehicle wheel comprising a body consisting of plies of body material having their peripheral portions dished, the plies being arranged in sets with the said portions curving in opposite directions and outwardly, and a tread extending about the said portions and supported thereby and forming a substantially integral part therewith.

22. A vehicle wheel comprising a body consisting of plies of resiliently yieldable body material and intervening bonding plies of cushioning material, the first-mentioned plies having their peripheral portions outwardly curved toward opposite sides of the body to provide tread sustaining shoulders, and a tread surrounding the body and resiliently supported by said shoulders.

In testimony whereof I affix my signature.

HARRY N. ATWOOD. [L. S.]